(12) United States Patent
Martin et al.

(10) Patent No.: US 6,353,899 B1
(45) Date of Patent: Mar. 5, 2002

(54) FAULT MANAGEMENT SYSTEM FOR A MULTIFUNCTIONAL PRINTING MACHINE

(75) Inventors: Andrew T. Martin, Webster; David S. Matthews, Rochester, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/058,567

(22) Filed: Apr. 10, 1998

(51) Int. Cl.[7] .................................................. H02H 3/05
(52) U.S. Cl. ............................................ 714/57; 714/47
(58) Field of Search .............................. 714/57, 47, 48, 714/2, 45; 358/406, 501, 504

(56) References Cited

U.S. PATENT DOCUMENTS

| | | | | |
|---|---|---|---|---|
| 4,745,602 A | * | 5/1988 | Morrell | 714/2 |
| 5,021,892 A | * | 6/1991 | Kita et al. | 358/468 |
| 5,175,633 A | * | 12/1992 | Saito et al. | 358/406 |
| 5,175,735 A | * | 12/1992 | Dahlby et al. | 714/2 |
| 5,200,958 A | * | 4/1993 | Hamilton et al. | 714/45 |
| 5,223,948 A | * | 6/1993 | Sakurai et al. | 358/404 |
| 5,276,799 A | * | 1/1994 | Rivshin | 395/502 |
| 5,299,296 A | * | 3/1994 | Padalino et al. | 395/112 |
| 5,640,248 A | * | 6/1997 | Hirokawa | 358/406 |
| 5,966,219 A | * | 10/1999 | Mori | 358/442 |
| 6,055,067 A | * | 4/2000 | Matsuda et al. | 358/468 |
| 6,057,939 A | * | 5/2000 | Cho | 358/401 |

* cited by examiner

Primary Examiner—Dieu-Minh Le
(74) Attorney, Agent, or Firm—Gary B. Cohen

(57) ABSTRACT

There is provided a fault management system for a printing system having a memory for storing a first set of attribute values and a second set of attribute values. The fault management system includes a user interface with a display screen upon which a selected one of the first set of attribute values and the second set of attribute values is displayable. The printing system further includes a system, responsive to which one of the first set of attribute values and second set of attribute values is to be displayed on said user interface display screen, for controlling display of one or both of a first set of fault related information and a second set of fault related information on the display screen. In practice the first set of fault related information is displayed on the display screen in response to accessing the first set of attribute values in the memory, and the second set of fault related information is displayed on the display screen in response to accessing the second set of attribute values in the memory.

20 Claims, 15 Drawing Sheets

Ready

Select any job below by touching the job line.

Job Status
Active Marking Jobs

| # | Job Name | Owner | Status |
|---|---|---|---|
| 1 | USlpec | Kkarn | Printing |
| 2 | Comm_mtg.pp | Rlcard | Pending |
| 3 | Codelist.txt | Btritus | Held: Needs Paper |
| 4 | Letter.doc | Jdoe | Held: User Request |
| 5 | Therapist.doc | Kkarn | Held: Sample Printed |
| 6 | Memo.doc | Jdoe | Held: Secure Print |

Change View

*FIG. 8*

FAULT MANAGEMENT SYSTEM FOR A MULTIFUNCTIONAL PRINTING MACHINE

BACKGROUND

This invention relates generally to a multifunctional printing machine with a plurality of services and a user interface including pathways, which multifunctional printing machine is disposable in one of the pathways, and more particularly to a fault management system which handles faults in the multifunctional printing machine as a function of either the service or pathway in which the multifunctional printing system is disposed.

It is known that a conventional copier, with its attendant hardware, may be subject to a system fault impacting the operation thereof. A system fault may include, among other things, a jam in a paper path or a disabled component (e.g. an empty toner housing). The fault condition may result in immediate shutdown of the copier, depending on the severity of the fault. That is, as disclosed by U.S. Pat. No. A-4,745,602 to Morrell, a system fault for a printer may be viewed as "fatal" or "nonfatal". As further disclosed, a fault light illuminates when an error occurs, and an error code is displayed. When a fatal error occurs, all functions within the printer are stopped until the fault is cleared. A method and operation for recording and diagnosing faults in a digital copier is further disclosed by U.S. Pat. No. 5,200,958 to Hamilton et al.

It is also known that digital copiers, which typically use a significant amount of software in operation thereof, may be subject to object faults. Software object faults may occur to result in such faults as illegal job parameters, corrupted data, resource problems, input master errors, font problems, etc. Mechanisms for managing such faults are an integral and necessary component of a printing system because such faults will often result in the interruption of the system, and possibly a crash of the system requiring that the system be rebooted. U.S. Pat. No. 175,735 to Dahlby et al. discloses a system in which the occurrence of software object faults in a job are monitored so that, when such faults are identified, an operator is informed of such software object faults prior to processing of the object. The system is provided with the means to process another object without operator intervention prior to correction of the faulted object, and to proceed with processing the faulted object after correction of the fault.

In a digital copier known as the DocuTech Production Publisher (Model 135) ("DocuTech" is a registered trademark of Xerox Corporation), a user interface is provided with icons, namely a scanner icon, and controller icon and a printer icon, to provide coded information regarding the status of a corresponding service or subsystem. In one example, when a fault occurs at a scanner, the scanner icon is configured in such a manner that a machine operator is directed to a fault clearance screen for further fault related information with respect to the scanner. It should be recognized that the DocuTech Production Publisher is based on a multi-tasking model (See U.S. Pat. No. 170,340 to Prokop et al.) in which a job may be scanned into one part of mass memory while a second job is being printed from another part of mass memory. Thus a scan or copy job can be captured for future printing irrespective of the status of the printer.

In the area of digital copying, there is a growth in demand for what is commonly referred to as "multifunctionality". As illustrated by U.S. Pat. No. 957,071 to Jones, a multifunctional digital copier can assume the form of an arrangement in which a single print engine (e.g. xerographic or thermal ink jet print engine) is coupled with a plurality of different image input devices (or services), with such devices being adapted to produce image related information for use by the printer. The '071 Patent discloses that the image related information, in one example, could have its origin in video facsimile signals, microfilm, data processing information, light scanning platens for full size documents, aperture cards and microfiche. The following patents also relate to the area of multifunctional digital copying: U.S. Pat. No. 821,107 to Naito et al.; U.S. Pat. No. 021,892 to Kata et al., U.S. Pat. No. 175,633 to Saito et al.; U.S. Pat. No. 223,948 Sakurai et al.; U.S. Pat. No. 276,799 to Rivshin; and U.S. Pat. No. 307,458 to Freiburg et al.

It should be recognized that the degree to which a multifunctional digital copier can use its various services may be constrained in a degraded or "limp" mode so that only certain types of jobs are processable. For instance in one form of "graceful degradation" print and/or fax receive jobs can be processed notwithstanding the existence of an offline scanner.

It is understood, by those skilled in the art, that the DocuTech Production Publisher is intended for use in a "print shop" environment where jobs are often captured for future printing. Accordingly copy jobs can be processed at the scanner notwithstanding a fault in the printer. It is also understood that this same sort of functionality can be achieved with a distributed copying system of the type sold by Hewlett-Packard. This is not the case with an integrated multifunctional printing machines where the image data for a copy job is transmitted directly to a page buffer from the scanner for immediate consumption by the print engine. Accordingly, if the print engine of a multifunctional printing machine is faulted due to, for example, a paper jam, then the copy job cannot be executed until the fault in the print engine is cleared. On the other hand, a scan-to-file or fax send job can be processed notwithstanding the presence of a faulted printer. It would be desirable to provide a system in which fault management varies dynamically as a function of the type of job being processed.

All of the disclosures of the above-referenced patents are incorporated herein by reference.

SUMMARY OF THE INVENTION

In accordance with one aspect of the presently disclosed invention there is provided a fault management system for a printing system having a first document processing service for processing a first type of job and a second document processing service for processing a second type of job. The first document processing service includes a first set of attribute values disposed in a first user interface dialog and the second document processing service includes a second set of attribute values disposed in a second user interface dialog. Each of a first set of fault related information, a second set of fault related information, the first user interface dialog and the second user interface dialog being stored in a memory of the printing system. The fault management system includes: a user interface with a display screen upon which a selected one of the first user interface dialog and the second user interface dialog is displayable; and a system, responsive to which one of the first user interface dialog and the second user interface dialog is to be displayed on said user interface display screen, for controlling display of one or both of the first set of fault related information and second set of fault related information on the display screen, the first set of fault related information being displayed on the display screen in response to accessing the first user interface dialog in the memory, and the second set of fault related information being displayed on the display screen in response to accessing the second user interface dialog in the memory.

In accordance with another aspect of the presently disclosed invention there is provided a fault management system for a printing system having a memory for storing a first set of attribute values and a second set of attribute values wherein each of the first and second sets of attribute values is selectively accessible by a printing system user. A first set of fault related information and a second set of fault related information are stored in the memory. The fault management system includes: a user interface with a display screen upon which a selected one of the first set of attribute values and the second set of attribute values is displayable; and a system, responsive to which one of the first set of attribute values and second set of attribute values is to be displayed on said user interface display screen, for controlling display of one or both of the first set of fault related information and second set of fault related information on the display screen, the first set of fault related information being displayed on the display screen in response to accessing the first set of attribute values in the memory, and the second set of fault related information being displayed on the display screen in response to accessing the second set of attribute values in the memory.

BRIEF DESCRIPTION OF THE DRAWINGS

FIG. 8 is a partial, elevational view of the operation panel of FIG. 6 displaying a window in a job status pathway;

DESCRIPTION OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
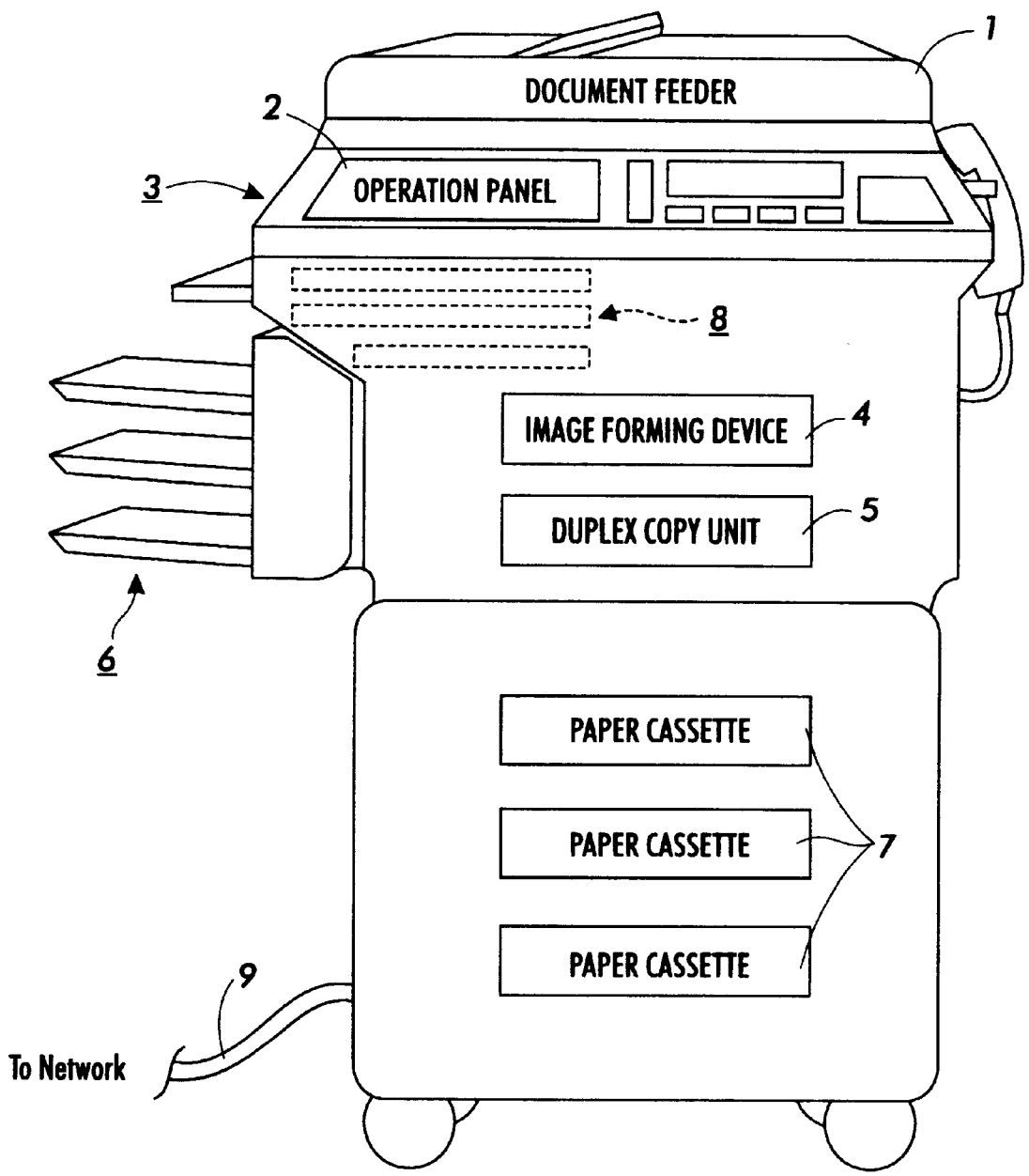
FIG. 1 a perspective view of a networked printing apparatus.

Referring to FIG. 1 of the drawings, a digital copier system of the type suitable for use with the preferred embodiment is shown. As shown, the system includes a document feeder 1 and an operation (and display) panel 2. After desired conditions have been entered on the operation panel 2, the document feeder 1 conveys a document to a predetermined reading position on an image reading device 3 and, after the document has been read, drives it away from the reading position. The image reading device 3 illuminates the document brought to the reading position thereof. The resulting reflection from the document is transformed to a corresponding electric signal, or image signal, by a solid state imaging device, e.g., a CCD (Charge Coupled Device) image sensor. An image forming device 4 forms an image represented by the image signal on a plain paper or a thermosensitive paper by an electrophotographic, thermosensitive, heat transfer, ink jet or similar conventional system.

As a paper is fed from any one of paper cassettes 7 to the image on forming device 4, the device 4 forms an image on one side of the paper. A duplex copy unit 5 is constructed to turn over the paper carrying the image on one side thereof and again feed it to the image forming device 4. As a result, an image is formed on the other side of the paper to complete a duplex copy. The duplex copy unit 5 has customarily been designed to refeed the paper immediately or to sequentially refeed a plurality of papers stacked one upon the other, from the bottom paper to the top paper. The papers, or duplex copies, driven out of the image forming device 4 are sequentially sorted by a sorter 6 in order of page or page by page.

Applications, generally 8, share the document feeder 1, operation panel 2, image reading device 3, image forming device 4, duplex unit 5, sorter 6, and paper cassettes 7 which are the resources built in the copier system. As will appear, the applications include a copier application, a printer (IOT) application, a facsimile (Fax) application and other applications. Additionally, the digital copier system is coupled with a network by way of a conventional network connection 9.

Figure 2:
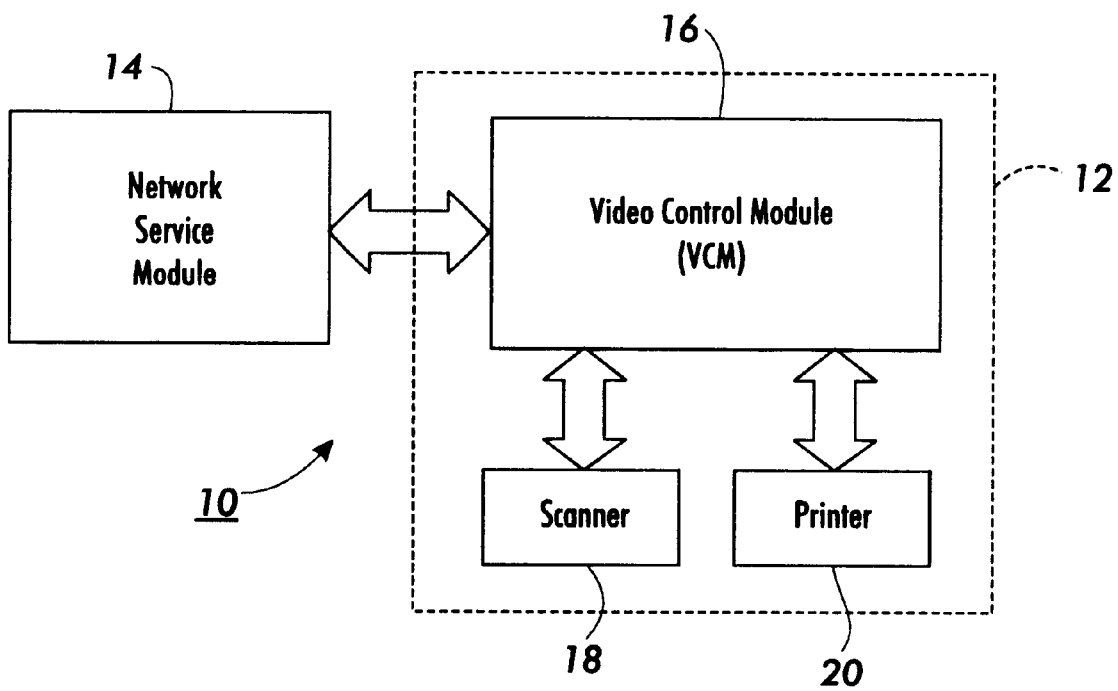
FIG. 2 is a block diagram depicting a multifunctional, network adaptive printing machine.

Referring to FIG. 2, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system 22 (FIG. 3), associated with the scanner 18, executes signal correction and the like, converts the corrected signals into multi-level signals (e.g. binary signals), compresses the multi-level signals and preferably stores the same in electronic precollation (EPC) memory 24.

Referring again to FIG. 2, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 3) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 3:
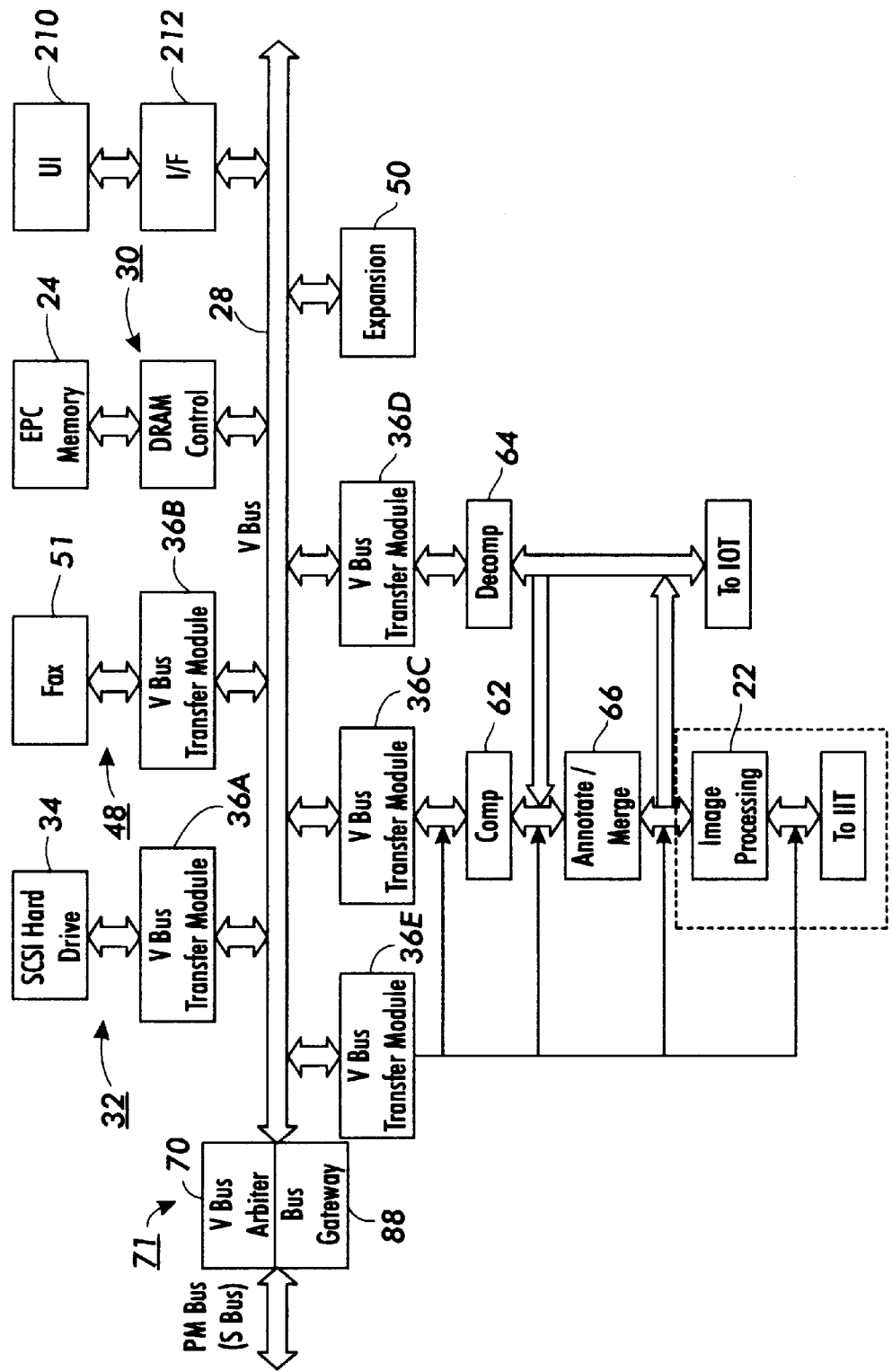
FIG. 3 is a block diagram of a video control module for the printing machine of FIG. 2.

Referring specifically to FIG. 3, the VCM 16 is discussed in further detail. The VCM 16 includes a video bus (VBus) 28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 Mbytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules. The mass memory section 32 includes a SCSI hard drive device 34 coupled to the VBus by way of a transfer module 36a. As will appear, other I/O and processing components are coupled respectively to the VBus by way of transfer modules 36. Further description of the transfer modules is provided by U.S. Pat. No. 682,467 to Ambalavanar, the disclosure of which is incorporated herein by reference. It will be appreciated that other devices (e.g. a workstation) could be coupled to the VBus by way of the transfer module 36a through use of a suitable interface and a SCSI line.

Figure 4:
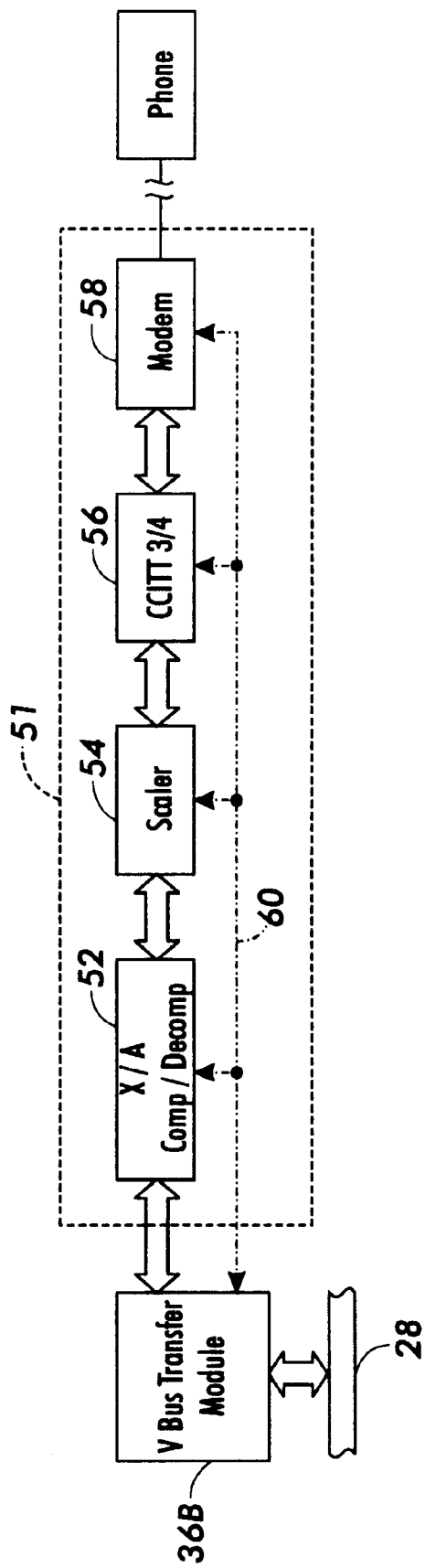
FIG. 4 is a block diagram of a facsimile card used in conjunction with the printing machine of FIG. 3.

Referring to FIGS. 2 and 3, three I/O components are shown as being coupled operatively to the VBus 28, namely a FAX module 48, the scanner or IIT 18, and the printer or IOT 20; however, it should be recognized that a wide variety of components could be coupled to the VBus by way an expansion slot 50. Referring to FIG. 4, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from CCITT format, and a modem 58, preferably manufactured by Rockwell Corporation, for transmitting CCITT formatted data from or to a telephone, by way of a conventional communication line.

Referring still to FIG. 4, each of the sections 52, 54 and 56 as well as modem 58 are coupled with the transfer module 36b by way of a control line 60. This permits transfers to be made to and from the FAX module 48 without involving a processor. As should be understood, the transfer module 36b can serve as a master or slave for the FAX module in that the transfer module can provide image data to the FAX for purposes of transmission or receive an incoming FAX. In operation, the transfer module 36b reacts to the FAX module in the same manner that it would react to any other I/O component. For example, to transmit a FAX job, the transfer module 36b feeds packets to the section 52 through use of the DMA transfer unit (not shown) and, once a packet is fed, the transfer module transmits an interrupt signal to the system processor 44 requesting another packet. In one embodiment, two packets are maintained in the packet buffer (not shown) so that "ping-ponging" can occur between the two packets. In this way, the transfer module 36b does not run out of image data even when the controller cannot get back to it immediately upon receiving an interrupt signal.

Referring again to FIG. 3, the IIT 18 and IOT 20 are operatively coupled to the VBus 28 by of transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® printing system. In practice, at least some of the functionality of the transfer modules is provided by way of a 3 channel DVMA device, which device provides local arbitration for the compression/decompression module.

As further illustrated by FIG. 3, the scanner 18, which includes the image processing section 22, is coupled with an annotate/merge module 66. Preferably, the image processing section includes one or more dedicated processors programmed to perform various desired functions, such as image enhancement, thresholding/screening, rotation, resolution conversion and TRC adjustment.

Figure 5:
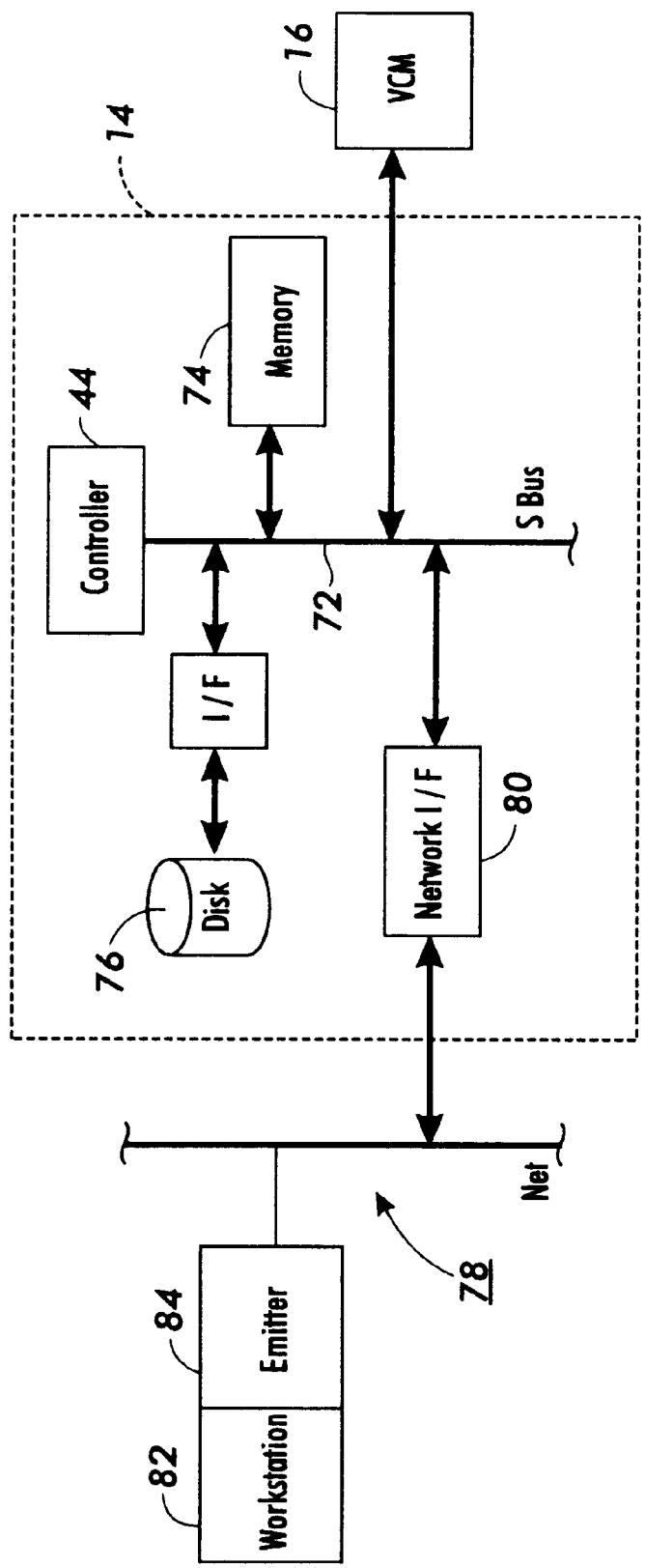
FIG. 5 is a block diagram of a network controller for the printing machine of FIG. 2.

Referring to FIG. 5, the network service module 14 is discussed in further detail. As will be recognized by those skilled in the art, the architecture of the network service module is similar to that of a known "PC clone". More particularly, in the preferred embodiment, the controller 44, which preferably assumes the form of a SPARC processor, manufactured by Sun Microsystems, Inc., is coupled with a standard SBus 72. In the illustrated embodiment of FIG. 5, a host memory 74, which preferably assumes the form of DRAM, and a SCSI disk drive device 76 are coupled operatively to the SBus 72. While not shown in FIG. 6, a storage or I/O device could be coupled with the SBus with a suitable interface chip. As further shown in FIG. 6, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. Pat. No. 493,634 to Bonk et al. and U.S. Pat. No. 226,112 to Mensing et al., the disclosures of both references being incorporated herein by reference.

In view of the discussion above, it will be appreciated that a host of operations, which exploit cooperation between the network and the digital copier (FIGS. 1, 2 and 5), can be obtained. For example, through cooperative effort between the network module 14 and the scanner 18 a user can perform scan-to-file operations of the type described in U.S. Pat. No. 619,649 to Kovnat et al.

Figure 6:
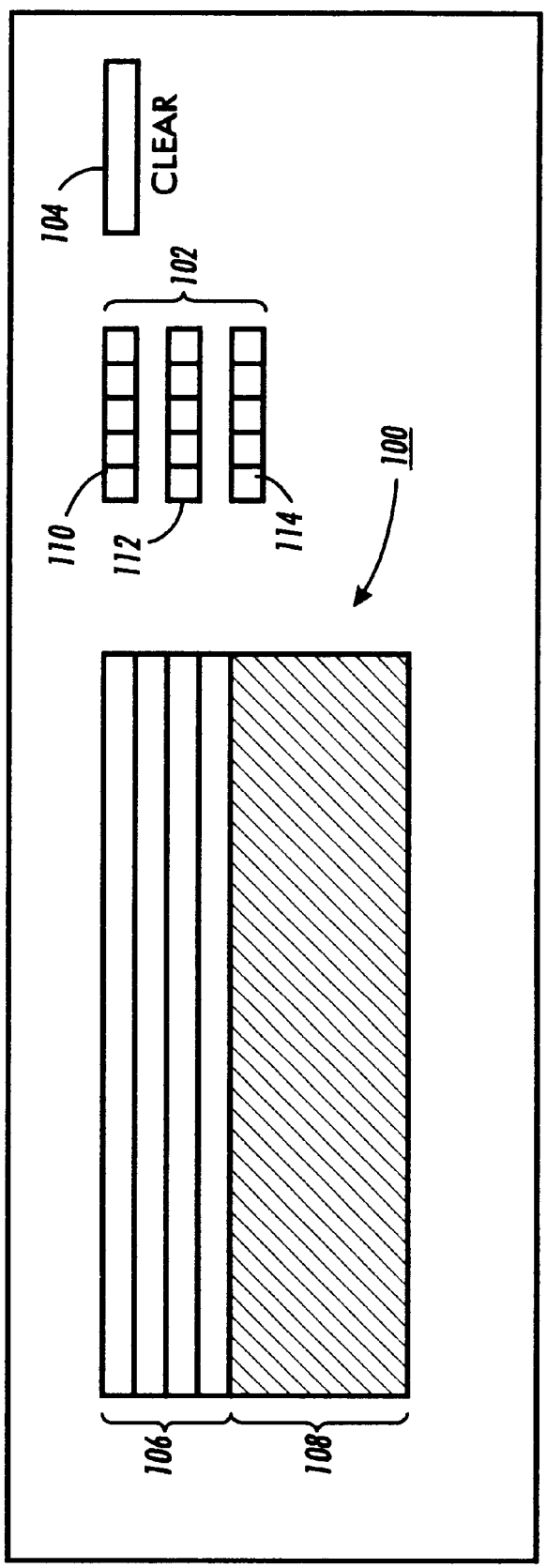
FIG. 6 is a schematic, detailed, elevational view of an operation panel shown in FIG. 1.

Referring now to FIG. 6, the operation panel shown in FIG. 1 is described in further detail. In particular, the operation panel includes a display area 100 and a set of pathway selection buttons 102. The operation panel further includes a clear button 104 which could be implemented as a "hard" button, as shown in the illustrated embodiment of FIG. 6, or as a "soft" button disposed in the display area 100.

Figure 7:
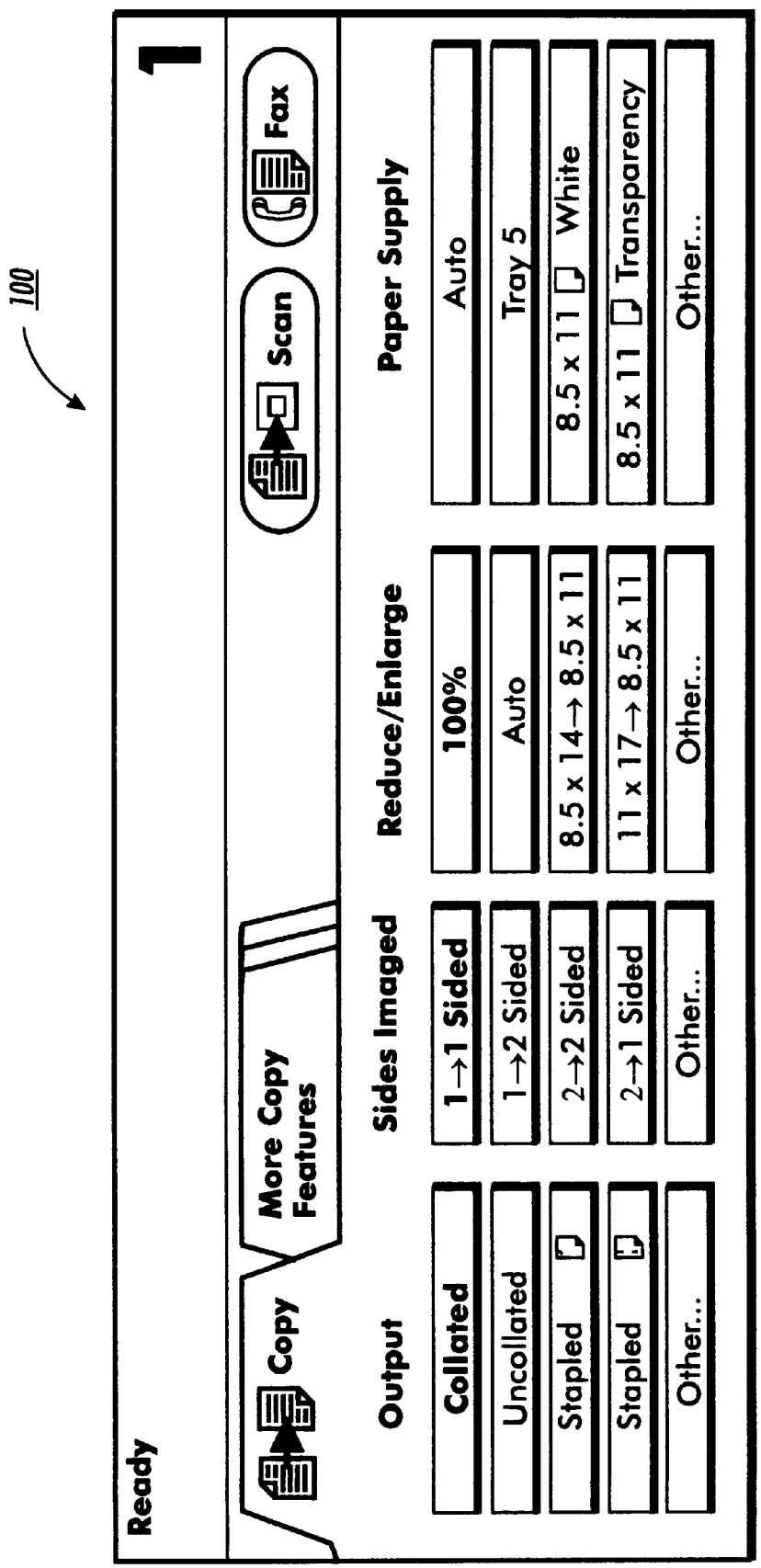
FIG. 7 is a partial, elevational view of the operation panel of FIG. 6 displaying a window in a features pathway.

Referring to FIGS. 6–9, the display area 100 is divided into a message display area 106, including a plurality of lines (see e.g. the three lines of messages shown in FIG. 8), and a pathway display area 108. It should be recognized that a "pathway" is a set of information or attribute values corresponding with a particular aspect of system functionality. Preferably a first pathway is provided for "features", a second pathway for "job status" and a third pathway for "machine status". As illustrated in FIG. 7, the features pathway may relate to the attribute values associated with a given job segment or job type. In a typical multifunctional printing machine, job segments include "copy job", "print (local or network) job", "fax (send and receive) job", "scan-to-file job", "test job", and so on. A detailed discussion of job types and their respective correspondence with services is described in detail in U.S. Pat. No. 600,762 to Salgado et al., the disclosure of which is incorporated herein by reference.

It follows that attribute values particular to a job are settable through use of the features pathway and that a given job type is mapped to one or more dialogs stored in one of memories 28 and 30 (FIG. 3). In the example of FIG. 7, a dialog for programming a copy job is displayed and a dialog specific to setting Fax attribute values can be obtained by pressing or enabling the "Fax" button. It will be appreciated that, in the preferred embodiment, the features pathway includes dialogs corresponding with many other services, such as print, scan-to-file, and test services.

Figure 9:
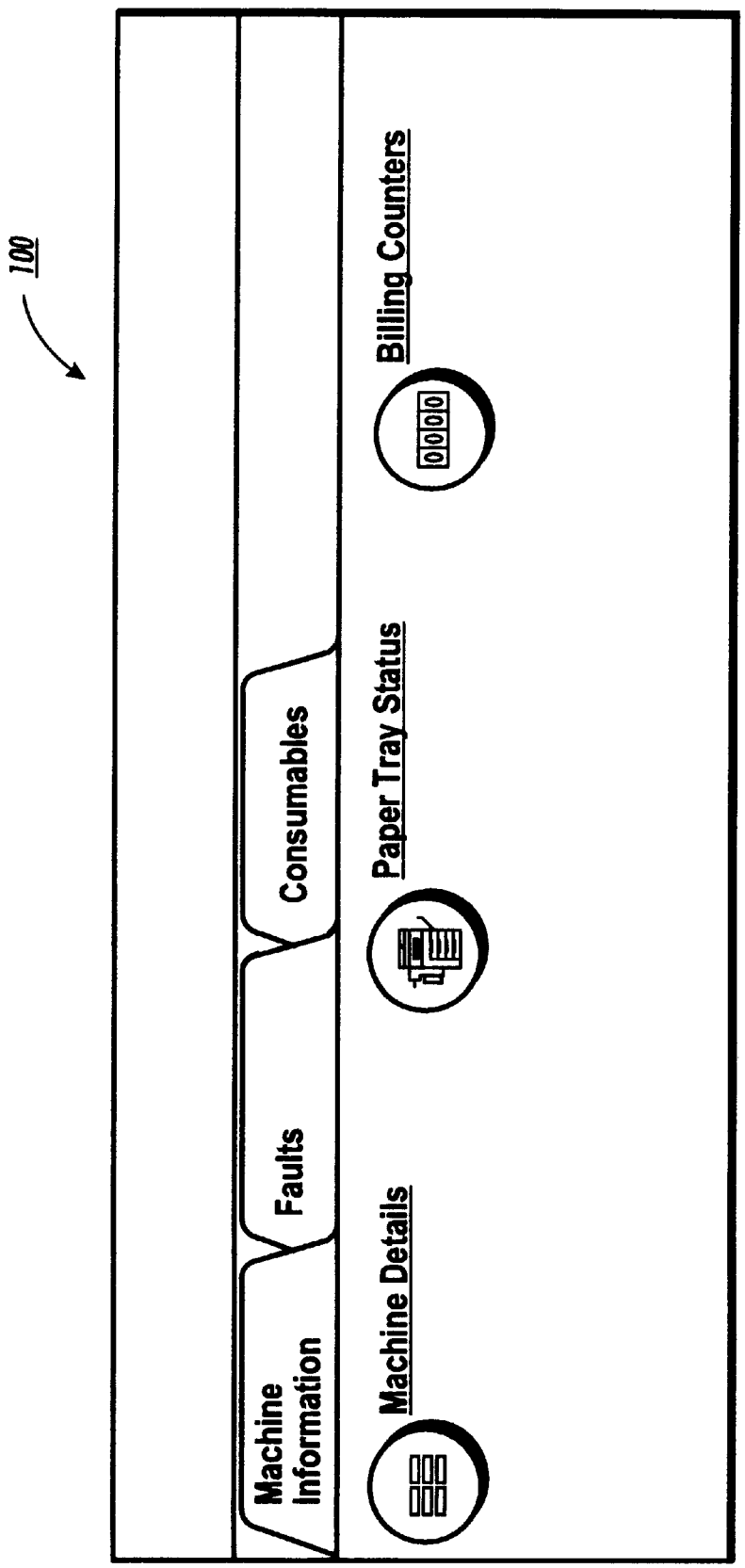
FIG. 9 is a partial, elevational view of the operation panel of FIG. 6 displaying a window in a machine status pathway.

As illustrated in FIG. 8, the job status pathway relates to information or settings about jobs queued up within the system. Such information may relate to, among other things, "job name", "job type", "job owner", "current job status" and "priority". As shown in FIG. 8, the job status pathway permits a system user to track progress of a particular job through the system. As illustrated by FIG. 9, the machine status pathway relates to information about selected job processing subsystems, such as status information for paper cassettes 7 (FIG. 1). It will be appreciated that the machine status pathway would typically include multiple dialogs for controlling a host of machine functions. For instance developer material level can be assessed through use of a development related dialog (not shown).

In the illustrated embodiment of FIG. 6, selected information of a given pathway is displayed by pressing one of the buttons 110, 112 and 114. In particular, button 110 is pressed to display a dialog in the features pathway, button 112 is pressed to display a dialog in the job status pathway, and button 114 is pressed to display a dialog in machine status pathway.

Figure 10:
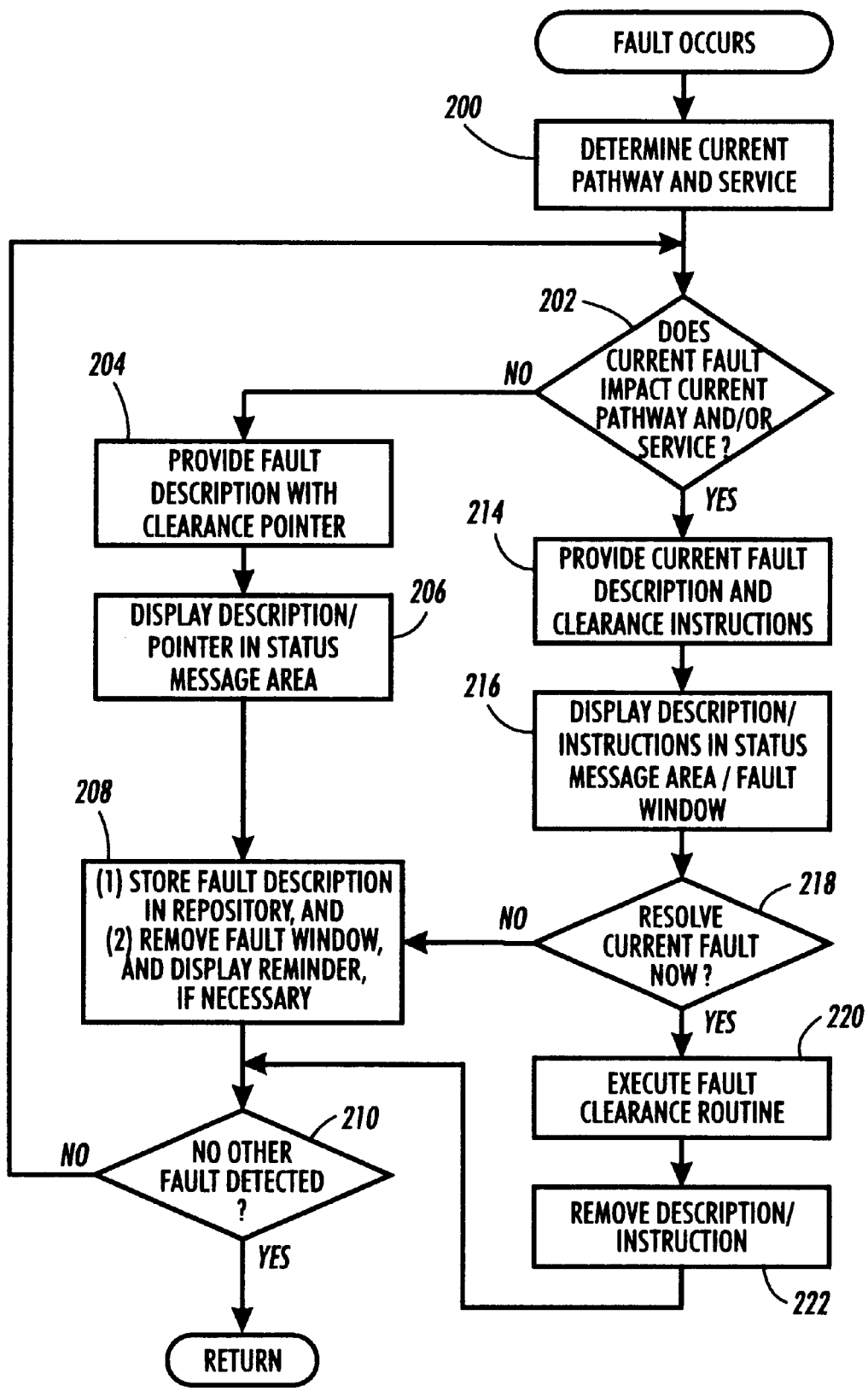
FIG. 10 is a flow diagram depicting a technique for selectively displaying fault information on the operation panel of FIG. 1.
Figure 11:
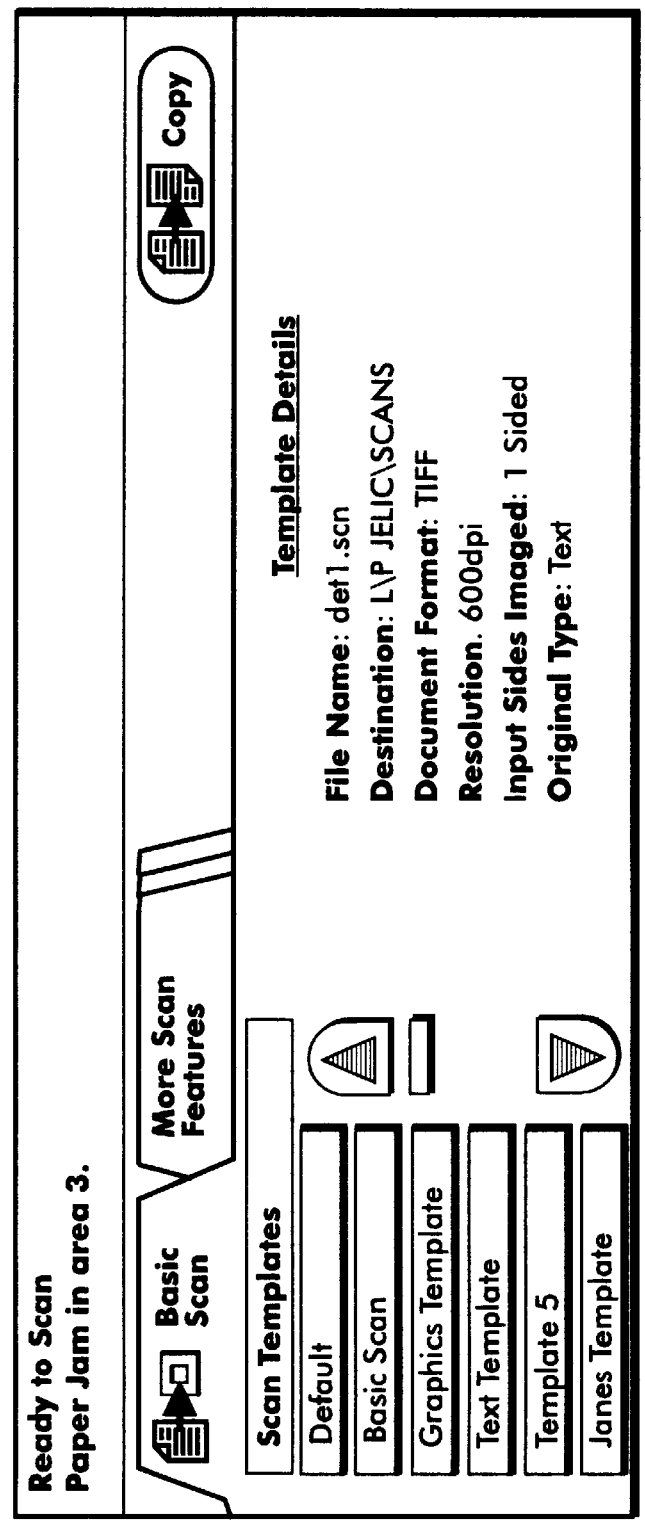
FIG. 11 is a partial, elevational view of the operation panel of FIG. 6 displaying a window in the features pathway where a message regarding a non-interrupting fault is displayed.
Figure 12:
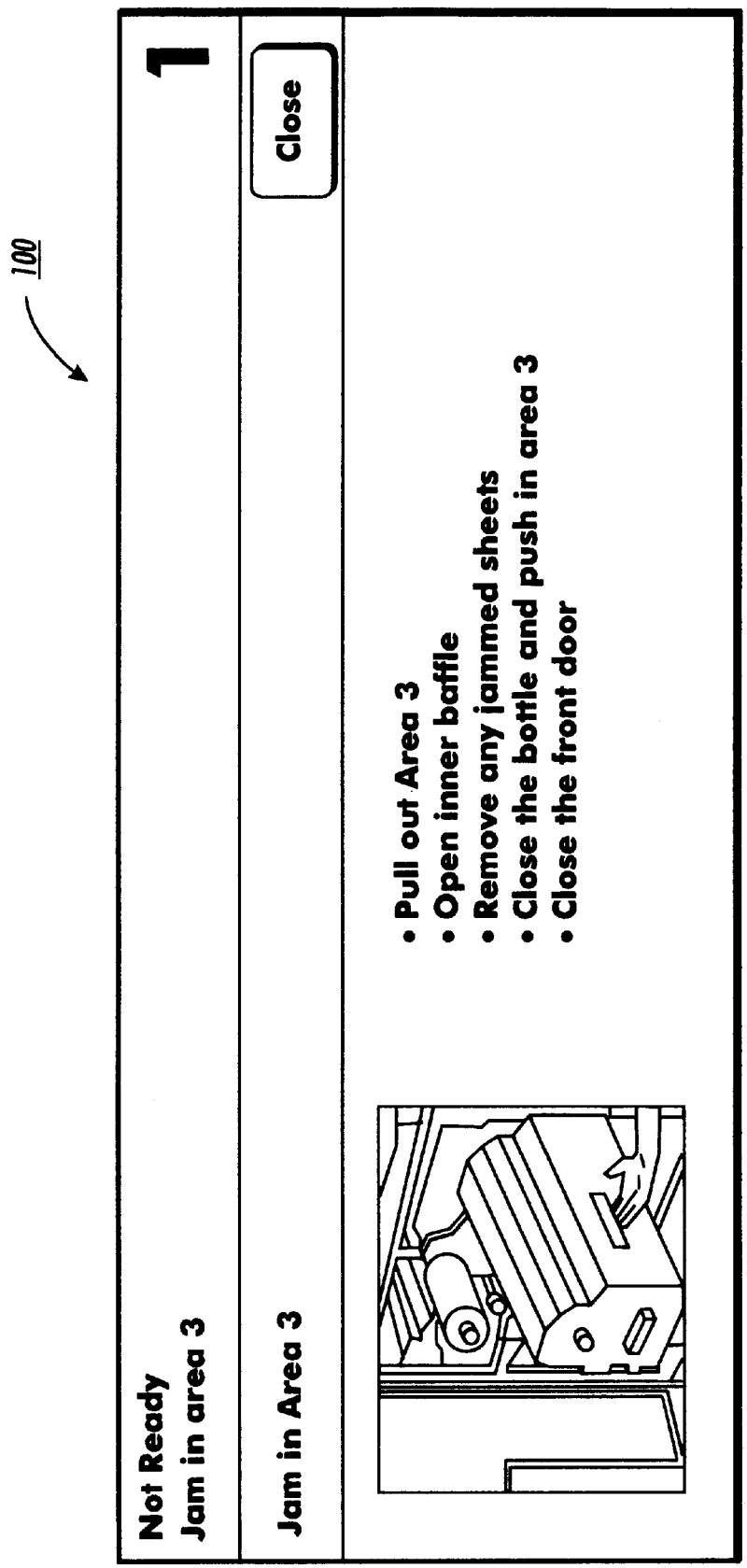
FIG. 12 is a partial, elevational view of the operation panel of FIG. 6 displaying a window in which instructions for clearing an interrupting fault are displayed.

Referring now to FIGS. 10–12, a preferred approach for managing faults in a multifunctional printing system is described. Referring specifically to FIG. 10, the fault management process is initiated when a given fault occurs. It follows from the above-description that the printing system can readily determine both the pathway and service in which a user resides when the fault occurs. Pursuant to making such determination at step 200, the process ascertains, at step 202, whether the present fault is in a current pathway and/or service. Assuming that the given or current fault does not impact the current pathway or service, then the process proceeds to step 204 where a clearance pointer and a fault description are provided. In turn, as shown in FIG. 11, the fault description and clearance pointer are, via step 206, displayed in the message area 106 (FIG. 6). For future reference, the fault description is then stored in a suitable memory location of the printing system (step 208). If no other fault is, in the meantime, detected (step 210), then the process effects a Return; otherwise, the process loops back to step 202 for another pathway/service determination.

To more fully comprehend how the present fault management scheme operates when the current fault does not impact the present service, reference is made to the following example. In the first example, a user accesses the features pathway to program a scan-to-file job. Just prior to accessing such pathway, a jam occurs in the printer (see FIG. 11). Since the jam in the paper path does not impact the service or pathway in which the user resides, only a description of the fault (e.g., "Paper Jam"), along with a suitable pointer (e.g., "in area 3") is provided in the message area.

To more fully comprehend how the present fault management scheme operates when the current fault does not impact the present pathway, reference is made to the following example. A user desires to program a copy job, but decides to review the status of other jobs in the print queue. In the meantime, the system runs out of toner. While running out of toner would directly impact the user if s/he were programming the copy job in the features pathway, only a fault description and clearance pointer will be provided while the user is in the pathway of the print queue, i.e. the job status pathway.

Referring again to FIG. 10, if the answer to the determination of question 202 is in the positive, then both a prestored fault description corresponding with the current fault and a set of clearance instructions is, via step 214, retrieved from memory of the network service module 14 (FIG. 5). In turn, as shown in FIG. 12, the description and instructions are, via step 216, displayed in the pathway display area 108 (FIG. 6). In response to the displaying of the description and instructions, the user is provided an option, at step 218, to either resolve the current fault or delay resolution for another time.

Figure 13:
FIG. 13 is a partial, elevational view of the operation panel of FIG. 6 displaying a window in the features pathway which indicates where fault clearance instructions can be found in the printing system.

If the user desires to resolve the fault at a later time, then the process proceeds to step 208 where, among other things, a message reminding the user of the fault (see FIG. 13) and indicating where clearance instructions can be found is provided. On the other hand, the user may seek to act as a "good citizen" and clear the current fault immediately by way of steps 220 and 222.

To more fully comprehend how the present fault management scheme operates when the current fault does impact the present service, reference is made to the following examples. In the first example, the user is in the process of programming a copy job while a print or fax (receive) job is being printed. Before completion of programming, a jam occurs in the printer so a fault description with corresponding clearance instructions are, as shown in FIG. 12, displayed in the pathway display area 106 (FIG. 6). In a second example, the user is programming a scan-to-file job in the Features pathway and determines that information regarding system software is required. Prior to initiating such program, toner level for the printer drops below a preset threshold. Accordingly, when the user switches to the machine status pathway, a fault description with corresponding clearance instructions is displayed for the sake of indicating an "out-of-toner" condition.

Figure 14:
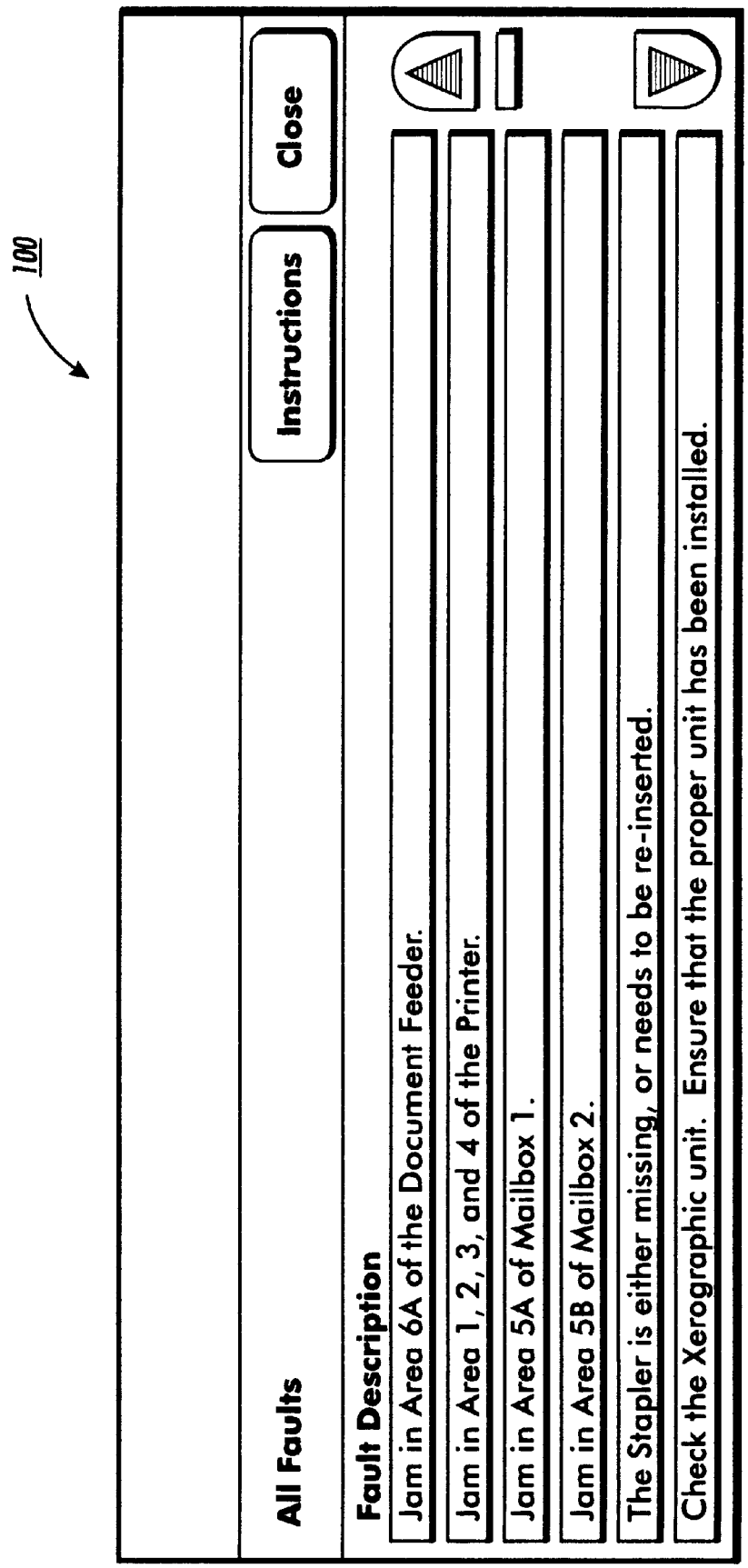
FIG. 14 is a partial, elevational view of the operation panel of FIG. 6 displaying a window in the machine status pathway having a list of printing system faults to be cleared.
Figure 15:
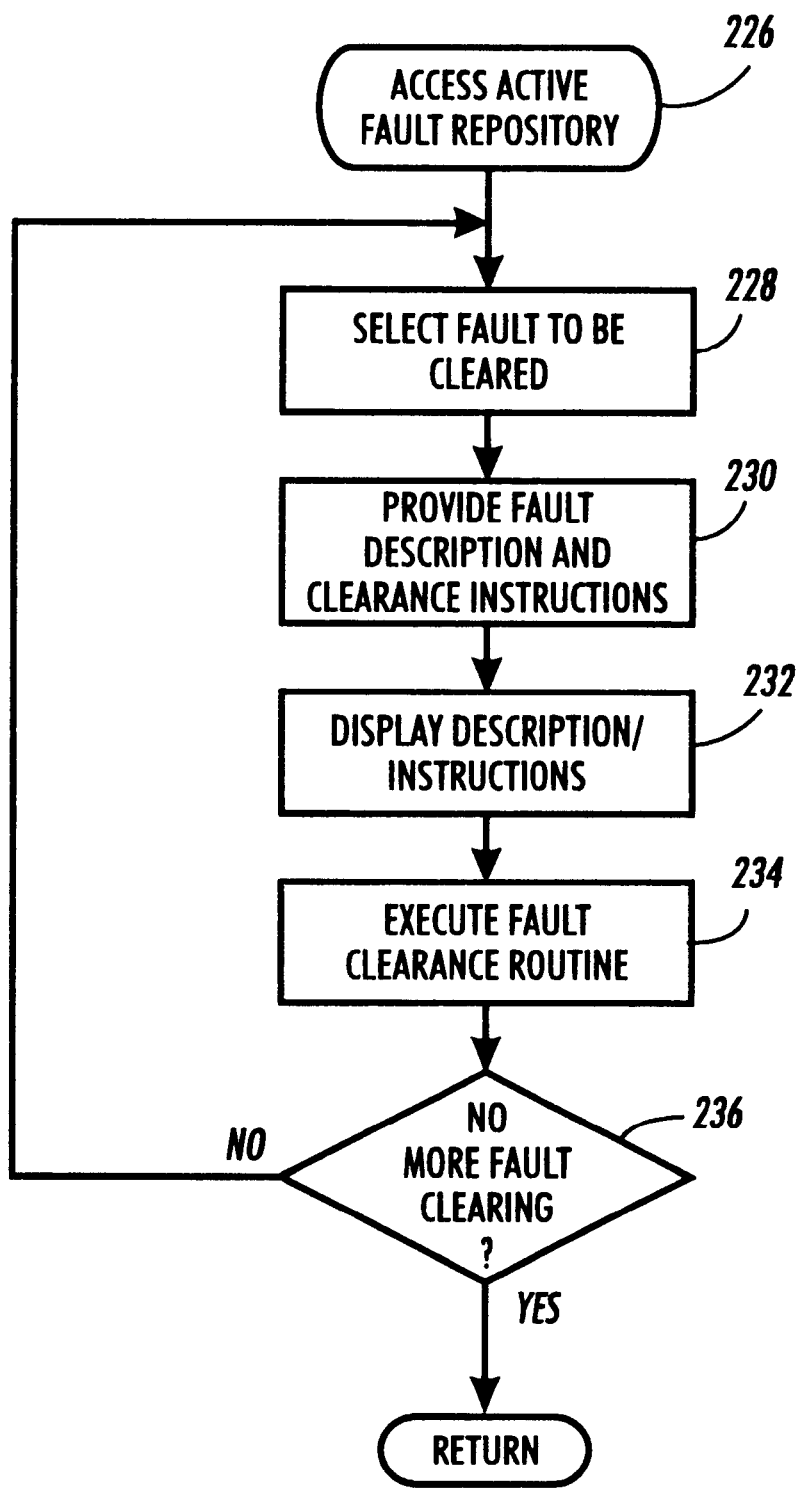
FIG. 15 is a flow diagram depicting a technique for clearing faults in the printing apparatus of FIG. 1.

As contemplated above, resolution of a fault can be delayed by either the system or the user. That is, in one approach the system automatically delays resolution and in another approach the user directs the system to delay resolution. In either event, clearance instructions are stored in a convenient memory location (referred to below as "Fault Repository") and associated with a selected pathway (e.g. the machine status pathway). Referring to FIGS. 14 and 15, a technique for clearing active faults is described. Once the user is ready to clear active faults, a Fault Repository dialog (FIG. 15) is accessed (step 226) and one of the faults described therein is selected with a suitable cursor (step 228). In response to such selection, a set of information of the type shown in FIG. 12 is, at step 230, provided for display at step 232. By reference to the information set, the user clears the current fault (step 234) and, if necessary, moves on to another fault (through use of step 236) for further fault clearing.

Numerous features of the above-described fault management arrangement will be appreciated by those skilled in the art. Some of the features which follow from the above description include:

Classifying faults as interrupting or non-interrupting depending on their impact relative to the demands of the current user;

Raising each non-interrupting message in the form of a message which does not hinder the user's interaction with the digital copier or printing machine;

Presenting an interrupting fault in the form of a fault window containing clearance instructions - a given window of this type can be closed by an operator who does not wish to clear the fault of the given window immediately; and Providing a centralized location or repository at which all user clearable faults associated with the system can be viewed and a simple approach for accessing corresponding clearance instructions for such clearable faults.

In accordance with the preferred fault management scheme, faults that are not in an user's critical pathway and/or service do not hinder the user, but faults that are critical to current operation automatically interrupt operation. As user's change pathway and/or service, the severity of outstanding faults are re-assessed. Using context of pathway and/or service to control the manner in which the user is apprised of faults promotes a user interface that is efficient and thus particularly well suited to the typical multifunctional printing machine environment.

What is claimed is:

1. In a document processing system with memory and multiple user accessible document processing services, the multiple user accessible document processing services including a first document processing service and a second document processing service, wherein the document processing system is capable of processing one of a first type of job and a second type of job, a method for managing the document processing system when a fault is detected in one of the first document processing service and the second processing service, comprising:

programming a job with information designating the job as being the first type of job;

wherein the fault occurs while the job is being processed in one of the first document processing service and the second document processing service;

when the fault occurs in the first document processing service, the user is prohibited from processing the job with the first processing service until remedial action is taken by the user for clearing the fault; and when the fault occurs in the second document processing service, (a) the user is permitted to process the job without taking any remedial action for clearing the fault and (b) a set of instructions for clearing the fault is stored in memory for later use in clearing the fault.

2. The method of claim 1, in which the document processing system includes a display screen for facilitating the user's interaction with the document processing system, further comprising displaying an indicator on the display screen to indicate how the set of instructions is to be accessed relative to the memory.

3. The method of claim 2, in which the display screen is partitionable into a first part and a second part, wherein the indicator is displayed in the first part.

4. The method of claim 2, further comprising displaying the set of instructions on the display screen before the user is permitted to process the job.

5. The method of claim 1, in which the document processing system includes a printer, further comprising configuring the first document processing service so that the first document processing service is printer dependent and configuring the second document processing service so that the second document processing service is printer independent.

6. The method of claim 1, further comprising providing the document processing system with a xerographic printing subsystem.

7. In a document processing system having memory, multiple pathways and multiple aspects of system functionality, the multiple pathways including a first pathway and a second pathway, the first pathway including a set of information corresponding with a first aspect of system functionality and the second pathway including a set of information corresponding with a second aspect of system functionality, wherein the document processing system is capable of processing one of a first type of job and a second type of job, a method for managing the document processing system when a fault is detected in one of the first document processing service and the second processing service, comprising:

programming a job with information designating the job as being the first type of job;

wherein the fault occurs with the job being used relative to one of the first pathway and the second pathway;

when the fault occurs in the first pathway, the user is prohibited from using the first pathway with respect to the job until remedial action is taken by the user for clearing the fault; and when the fault occurs in the second pathway, (a) the user is permitted to use the second pathway with respect to the job without taking any remedial action for clearing the fault and (b) a set of instructions for clearing the fault is stored in memory for later use in clearing the fault.

8. The method of claim 7, in which the document processing system includes a display screen for facilitating the user's interaction with the document processing system, further comprising displaying an indicator on the display screen to indicate how the set of instructions is to be accessed relative to the memory.

9. The method of claim 8, in which the display screen is partitionable into a first part and a second part, wherein the indicator is displayed in the first part.

10. The method of claim 8, in which the fault occurs in the second pathway, further comprising displaying the set of instructions on the display screen before the user is permitted to use the second pathway.

11. The method of claim 7, further comprising configuring the first pathway to include one or more attribute values usable in job programming and configuring the second pathway to include a job queue.

12. The method of claim 7, further comprising providing the document processing system with a xerographic printing subsystem.

13. A system for managing a document processing system when a fault is detected in the document processing system, comprising:

a memory;

multiple user accessible document processing services, the multiple user accessible document processing services including a first document processing service and a second document processing service;

wherein the document processing system is capable of processing one of a first type of job and a second type of job;

wherein a job is programmed with information designating the job as being the first type of job; and wherein the fault occurs while the job is being processed in one of the first document processing service and the second document processing service; and a processor being configured so that, when the fault occurs in the first document processing service, the user is prohibited from processing the job with the first processing service until remedial action is taken by the user for clearing the fault, and when the fault occurs in the second document processing service, (a) the user is permitted to process the job without taking any remedial action for clearing the fault and (b) a set of instructions for clearing the fault is stored in memory for later use in clearing the fault.

14. The system of claim 13, further comprising a display screen for facilitating the user's interaction with the document processing system, wherein an indicator is displayed on the display indicate how the set of instructions is to be accessed relative to the memory.

15. The system of claim 14, wherein said display screen is partitionable into a first part and a second part, and wherein the indicator is displayed in the first part.

16. The method of claim 14, wherein the set of instructions is displayed on said display screen before the user is permitted to process the job.

17. A system for managing a document processing system when a fault is detected in the document processing, comprising:

a memory;

multiple pathways including a first pathway having a set of information corresponding with a first aspect of system functionality and a second pathway including a set of information corresponding with a second aspect of system functionality;

wherein the document processing system is capable of processing one of a first type of job and a second type of job;

wherein a job is programmed with information designating the job as being the first type of job;

wherein the fault occurs with the job being used with respect to one of the first pathway and the second pathway;

a processor being configured so that, when the fault occurs in the first pathway, the user is prohibited from using the first pathway with respect to the job until remedial action is taken by the user for clearing the fault, and when the fault occurs in the second pathway, (a) the user is permitted to use the second pathway with respect to the job without taking any remedial action for clearing the fault and (b) a set of instructions for clearing the fault is stored in memory for later use in clearing the fault.

18. The system of claim 17, further comprising a display screen for facilitating the user's interaction with the document processing system, wherein an indicator is displayed on the display screen to indicate how the set of instructions is to be accessed relative to the memory.

19. The system of claim 18, wherein said display screen is partitionable into a first part and a second part, and wherein the indicator is displayed in the first part.

20. The method of claim 18, wherein the set of instructions is displayed on said display screen before the user is permitted to process the job.

* * * * *